(12) United States Patent
Cotter

(10) Patent No.: US 6,269,771 B1
(45) Date of Patent: Aug. 7, 2001

(54) MULTI-STATION BIRD FEEDER WITH SQUIRREL GUARD

(76) Inventor: Edward J. Cotter, 1 Windcrest Dr., Tyngsboro, MA (US) 01879

( * ) Notice: Subject to any disclaimer, the term of this patent is extended or adjusted under 35 U.S.C. 154(b) by 0 days.

(21) Appl. No.: 09/378,890

(22) Filed: Aug. 23, 1999

(51) Int. Cl.$^7$ ................................................ A01K 39/01
(52) U.S. Cl. .................................................... 119/57.9
(58) Field of Search ............................... 119/52.2, 52.3, 119/57.8, 57.9

(56) References Cited

U.S. PATENT DOCUMENTS

| | | | |
|---|---|---|---|
| D. 194,109 | 11/1962 | Dilley | D31/2 |
| 2,856,898 | 10/1958 | Doubleday et al. | |
| 2,887,988 | * 5/1959 | Cottongim | 119/57.9 |
| 2,891,508 | 6/1959 | Bower | |
| 4,031,856 | 6/1977 | Chester | |
| 4,765,277 | 8/1988 | Bailey et al. | |
| 4,767,088 | * 8/1988 | Fielder et al. | 119/57.9 X |
| 4,867,104 | 9/1989 | Vandiver | 119/57.9 |
| 5,086,730 | 2/1992 | Figley | 119/52.3 |
| 5,195,460 | 3/1993 | Loken | 119/57.9 |
| 5,205,239 | 4/1993 | Stolwein | 119/52.3 |
| 5,285,748 | 2/1994 | Weldin | 119/57.9 |
| 5,293,835 | 3/1994 | Shagoury | 119/57.9 |
| 5,295,455 | * 3/1994 | Johnson | 119/52.3 X |
| 5,339,767 | 8/1994 | Krag | 119/57.8 |
| 5,355,835 | 10/1994 | Freed | 119/57.9 |
| 5,410,986 | 5/1995 | Washam | 119/52.2 |
| 5,413,069 | 5/1995 | Currie | 119/52.2 |
| 5,479,880 | * 1/1996 | Stuhr et al. | 119/57.8 |
| 5,642,687 | 7/1997 | Nylen et al. | 119/52.3 |

* cited by examiner

Primary Examiner—Robert P. Swiatek
(74) Attorney, Agent, or Firm—Pearson & Pearson, LLP

(57) ABSTRACT

A multi-station, weather resistant bird feeder comprises a squirrel guard positioned around a pole at a predetermined position above the ground. A platform feeder station is secured to the top of the pole for holding a removable screen assembly. The screen assembly comprises a fine screen on top of a course screen both secured by a frame and used for holding bird seed thereon. Four arms extend from each side of a four sided pole below the platform feeder station, each extended arm is supported by an angle brace. A hanging feeder may be positioned on each one of the extended arms, whereby bird watchers can observe larger birds on the platform feeder stations and smaller birds on the hanging feeder stations.

17 Claims, 4 Drawing Sheets

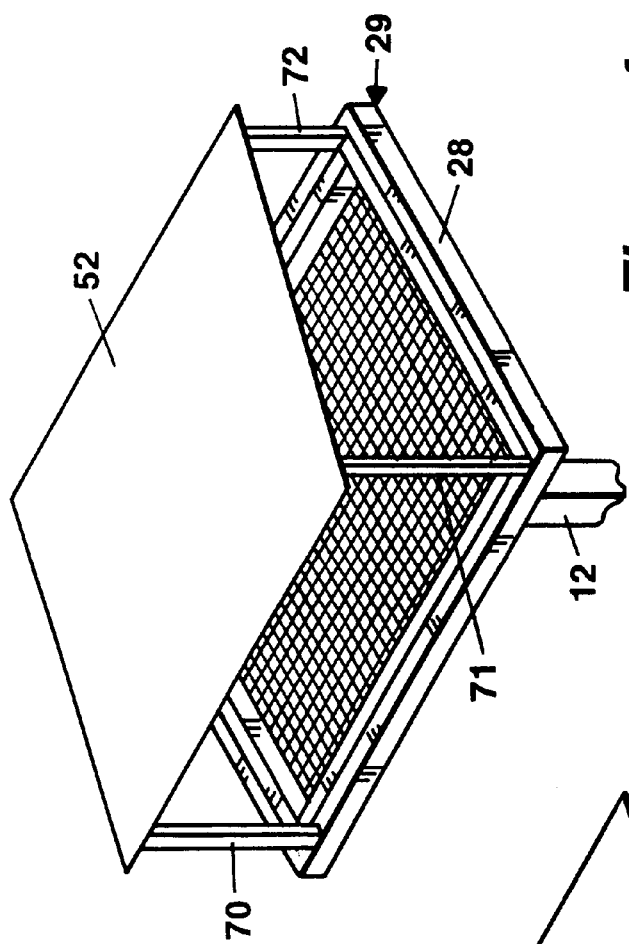
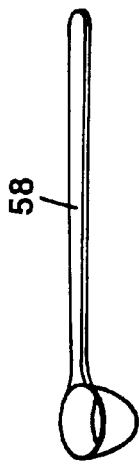
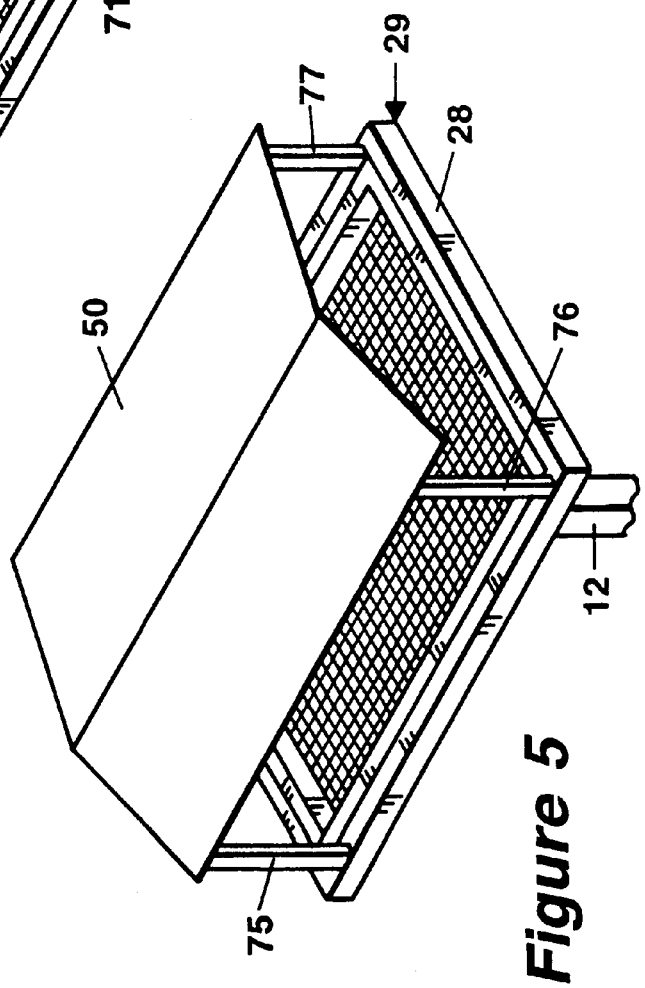

MULTI-STATION BIRD FEEDER WITH SQUIRREL GUARD

BACKGROUND OF THE INVENTION

1. Field of the Invention

The present invention relates generally to bird feeders and more particularly to a multi-station bird feeder having a squirrel guard to protect the bird food from squirrels or the like.

2. Description of Related Art

Bird enthusiasts often set up feeding stations for feeding birds and also for being able to watch the birds when they are eating. Larger birds often eat the food first and prevent smaller birds from using a feeder. However, squirrels have been notorious for eating bird seed before any birds have an opportunity to eat the seed. Many devices have been designed to try to prevent squirrels from getting at the food which includes the following:

In U.S. Pat. No. 4,867,104 issued Sep. 19, 1989 to Vandiver, a bird feeder is disclosed with a squirrel guard and a peaked roof. The squirrel guard is mounted on the base platform of the feeder 10 and includes roller elements which extend completely around its perimeter. The elements rotate to prevent the animal from climbing past the guard onto the feeder.

In U.S. Pat. No. 5,195,460 issued Mar. 23, 1993 to Loken, a tube-shaped bird feeder is disclosed with a tiltable perch on the bottom of individual bird feeders which allows a person to control the maximum weight of a bird that can feed on the feeder. The feeders can be gang mounted on a post stand to permit multiple birds to eat at the feeders. A domed shape saucer with an annular trough collects spilled seed.

In the U.S. Pat. No. 5,205,239 issued Apr. 27, 1993 to Stolwein, a bird feeding device with a squirrel guard is disclosed. The bird feeder comprises a plurality of cylindrical bird seed containers disposed side-by side and parallel to each other and open at the top to provide longitudinally slots. A plurality of trough means having slanted sidewalls extend along the length of the slots. A feedbox is provided with a lid and mounted on four posts which extend from the bottom of base tray. The width of slots are wide enough for birds to get the bird seed but too narrow to permit a squirrel,s mouth or jaws to enter slots to access the seed.

In U.S. Pat. No. 5,355,835 issued Oct. 18, 1994 to Freed, a marauder-deterrent bird feeder and platform slide assembly is disclosed including a hollow upright pole adapted at a top end to support the bird feeder and platform subassembly mounted about the pole for undergoing reciprocal movement between the bottom and top ends of the pole. There are lower and upper pluralities of guide rollers respectively mounted to the lower and upper ends of the platform subassembly and rollably engaging the pole below and above the platform subassembly so as to movably support the platform subassembly on the pole, and means mounted to the pole and connected to the platform subassembly for biasing the platform subassembly to move upward toward a raised home position below the top end of the pole when there is no animal weight on the platform, the biasing means being yieldable away from the raised home position to permit the platform subassembly to move downward in response to the weight of a marauding animal on the platform.

In U.S. Pat. No. 5,642,687 issued Jul. 1, 1997 to Nylen et al. a squirrel baffler is disclosed which is generally conical in shape and mounted on a bird feeder pole.

SUMMARY OF THE INVENTION

Accordingly, it is therefore an object of this invention to provide a multi-station bird feeder having means for protection from squirrels.

It is yet another object of the invention to provide a three level system to protect, feed and separate birds wherein a platform with a removable screen provides feeding for large birds, four horizontal arms provide for changeable feeding stations for smaller birds, a squirrel guard prevents squirrels access to the feeder, and seed spilled from the feeders provides feed for ground feeding birds.

It is another object of the invention to provide a platform feeder station on top of the multi-station bird feeder and having other bird feeder stations under the platform feeder station.

It is another object of this invention to provide a weather resistant multi-station bird feeder.

It is another object of the invention to provide a platform feeding station on top of a multi-station bird feeder, wherein the platform feeder includes crossmembers for water drainage, air circulation, and support for the removable screen.

It is a further object of this invention to enable separation between larger birds and smaller birds feeding on the multi-station feeder.

It is yet another object of the invention to facilitate changeable feeding stations on the bird feeder to attract multiple species of birds during all seasons.

These and other objects are accomplished by a bird feeder comprising means installed in the ground for supporting a feeder station, the feeder station positioned on top of the supporting means, the feeder station comprises a screen assembly means disposed within the platform station for holding bird seed, and means positioned around a portion of the supporting means at a predetermined distance above the ground for preventing squirrels and other predators from climbing-up the supporting means, the preventing means comprises a polished surface. The bird feeder comprises means for providing a plurality of feeder stations on the upper portion of the supporting means. The bird feeder comprises the feeder station on top of the supporting means and the plurality of feeder stations a predetermined distance below the top feeder station. The removable screen assembly means comprises a fine screen disposed on top of a course screen both secured within a frame with bird seed placed thereon. The supporting means comprises a plurality of extended arms perpendicular to the supporting means for hanging feeder stations.

The objects are further accomplished by a multi-station bird feeder comprising means installed in the ground for supporting a feed platform, the feed platform positioned on top of the supporting means, means positioned around a portion of the supporting means at a predetermined distance above the ground for preventing squirrels and other predators from climbing-up the supporting means, means, extending in a plurality of directions around the supporting means under the feed platform for hanging a plurality of feeder stations. The feed platform comprises a removable screen assembly means for holding bird seed. The removable screen assembly comprises a fine screen positioned on top of a course screen both secured by a frame, the course screen having the bird seed placed thereon, and a cross-support means attached under the screens for preventing the fine screen and the course screen from sagging. The preventing means around a portion of the supporting means comprises a material having a polished surface. The material having a polished surface includes aluminum, copper, ceramic or plastic.

The objects are further accomplished by a multi-station bird feeder having a squirrel guard for preventing squirrels and other predators from reaching the feeder comprising a pole having a predetermined length, a first portion being inserted into the ground and a second portion extending above the ground, a feeder station attached to the top of the pole comprising a removable screen assembly, the screen assembly comprises a fine screen disposed on top of a course screen, and a plurality of arms extending from the pole a predetermined distance below the feeder station for hanging a plurality of feeder stations, the squirrel guard includes a material having a polished surface surrounding the pole starting a first predetermined distance above the ground and extending up the pole a second predetermined distance. The material of the squirrel guard comprises one of a plurality of materials including aluminum, copper, ceramic or plastic. The pole comprises 4 sides. The fine screen disposed on top of the course screen includes an upper frame and a lower frame for securing the fine screen and the course screen, and a cross-support means attached under the course screen for preventing the course screen from sagging.

The objects are further accomplished by a method of providing a multi-station bird feeder with squirrel protection comprising the steps of installing a pole in the ground for supporting a feeder station on top of the pole, providing a removable screen assembly in the feeder station for holding bird seed, mounting around the pole at a predetermined distance above the ground, a material having a polished surface for preventing squirrels and other predators from climbing-up the pole, and extending arms from sides of the pole above the squirrel protection for hanging a plurality of feeder stations. The step of providing a removable screen assembly means comprises the steps of positioning a fine screen on top of a course screen, and securing the fine screen and the course screen within an upper frame and a lower frame. The step of mounting a polished surface material means around the pole comprises the step of using one of a plurality of materials including aluminum, copper, ceramic or plastic. The method comprises the step of positioning a slanted roof supported by posts on the feed platform. The method comprises the step of positioning a double pitched roof supported by posts on the feed platform.

Additional objects, features and advantages of the invention will become apparent to those skilled in the art upon consideration of the following detailed description of the preferred embodiments exemplifying the best mode of carrying out the invention as presently perceived.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

FIG. 4 is a perspective view of a protective pitched roof for the top of the platform feeder station of FIG. 1;

FIG. 5 is a perspective view of an alternate embodiment of a protective double pitched roof for the top of the platform feeder station of FIG. 1; and FIG. 6 shows a side elevation view of a cup with an extended handle for adding bird seed to the platform feeder station on top of the pole.

DESCRIPTION OF ILLUSTRATIVE EMBODIMENTS

Figure 1:
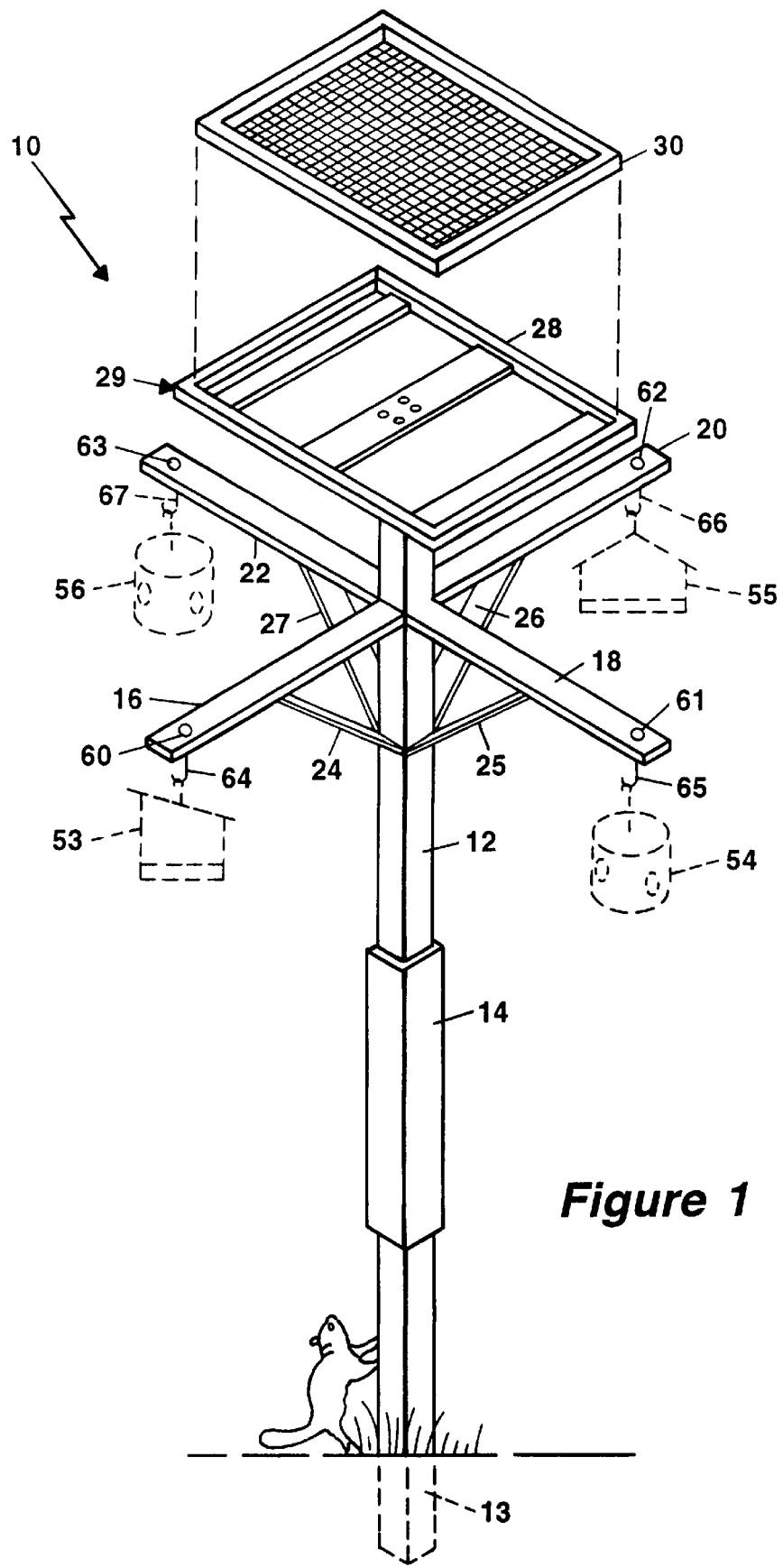
FIG. 1 is a partially exploded perspective view of the invention of a multi-station bird feeder showing a squirrel guard positioned around a pole.

Referring to FIG. 1, a partially exploded perspective view of the invention shows a multi-station feeder 10 comprising a pole 12, a top platform feeder station 29, extended arms 16, 18, 20, 22 and a squirrel guard 14 for preventing squirrels from reaching the bird seed in feeder stations 29, 53, 54, 55, 56 at or near the upper portion of the feeder 10. The squirrel guard 14 is positioned on the pole 12 approximately thirty-two (32) inches from the top of the pole, and it extends down the pole 12 covering all sides approximately 36 inches. The pole generally extends at least 8 feet above the ground.

The squirrel guard 14 may be embodied by polished low friction materials such as copper, ceramic tiles, plastic, or other synthetic materials having a highly polished surface so that a squirrel or other similarly sized animal cannot climb up to the feeder stations. In the preferred embodiment sheet aluminum is wrapped tightly around the pole 12 and secured by nails on one side of the pole 12.

The total height of the pole should be 10 feet for optimal viewing of birds; however, other heights will also work well. In the preferred embodiment the pole 12 should be two feet under ground for stability and extend eight feet above the ground. The pole 12 width and depth measures 4 inches by 4 inches. It can be readily observed that if the pole 12 was too short a squirrel could jump above the squirrel guard to gain access to the bird seed at the top. Therefore, generally owner preference and practicality determines the length of the pole 12.

The pole 12 comprises four extended arms 16, 18, 20, 22 located a short distance down from the top of the pole 12 typically six inches. The extended arms 16, 18, 20, 22 extend out about 20 inches from each side of the four sided pole 12. The extended arms 16, 18, 20, 22 are supported by 45 degree angle braces 24, 25, 26, 27 respectively each angle brace being approximately 15 inches long. The pole 12 and extended arms 16, 18, 20, 22 are implemented with pressure treated wood for weather resistance.

Still referring to FIG. 1, the top of the multi-station feeder 10 comprises the platform feeder station 29 which includes a box 28 into which a screen assembly 30 is inserted. The center of the box 28 is secured to the top of the pole 12 by means of galvanized screws. The screen assembly 30 rests on three cross boards 34, 36, 38 in the box 28 which enables water drainage from the screen and air circulation around the screen.

Each of the extended arms 16, 18, 20, 22 has a hole near its outer end into which a straight section of a metal hook 64–67 is inserted from the bottom side and secured into a hardwood knob 60–63 positioned on top of the hole of each extended arm 16, 18, 20, 22.

Four easily changeable feeding stations 53–56 are hung on the hooks 64, 65, 66, 67 respectively of extended arms 16, 18, 20, 22. This provides a variety of bird feeding options during all four seasons and enables the multi-station bird feeder owner to attract multiple species of birds all year long.

The four hanging bird feeder stations 53–56 allow a bird enthusiast to quickly and easily refill or change the feeder stations as desired. The platform feeder station 29 may be used to attract the larger species of birds. The hanging feeder stations 53–56 are designed to permit smaller birds to feed, thereby providing a separation or protective barrier between the larger birds and the smaller birds. In addition, seed spilled from the feeders provides feed for ground feeding birds.

Figure 2:
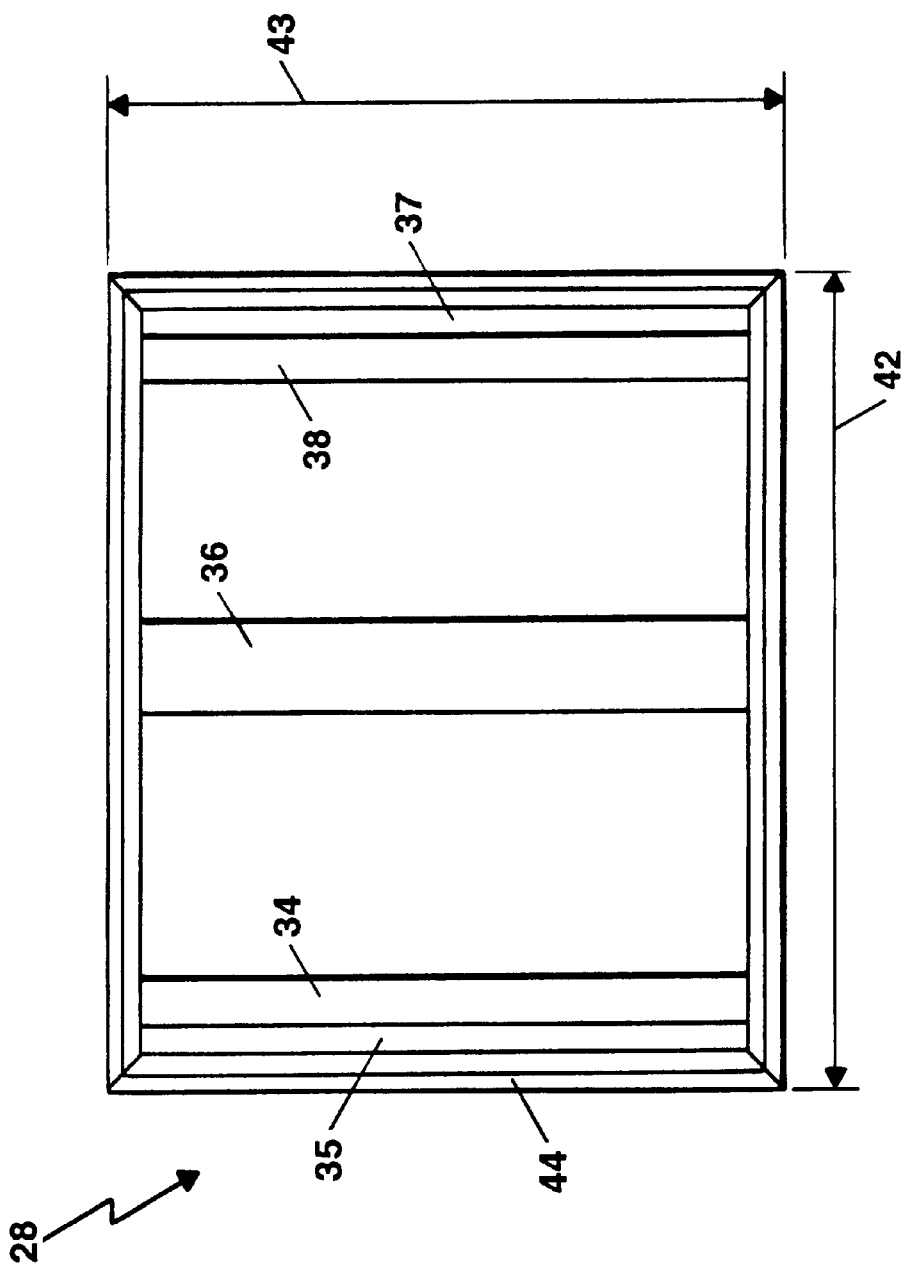
FIG. 2. is a top view of a platform feeder station of FIG. 1 with a feeder screen assembly removed.

Referring now to FIG. 2, a top view of the box 28 of the platform feeder station 29 is shown with the feeder screen assembly 30 removed. The box 28 of the preferred embodiment which mounts on top of the pole 12 measures 20 inches wide 42, by 18 inches deep 43, by 2½ inches high (FIG. 1), and it comprises two end boards 34, 38 and a center board 36 which are secured by screws entering from the sides of the box 28. The inner portion 44 of the top surfaces of the box 28 is recessed approximately 5/16 inch and provides a 5/16 inch ledge around the inside perimeter. The end boards 34, 38 are positioned approximately ⅛ inch away from the end walls providing spaces 35, 37 to allow for ventilation and drainage. In the preferred embodiment the end boards 34, 38 measure approximately 2½ inches wide by 18 inches long by 1 inch high, and the center board 36 measures approximately 3½ inches wide by 18 inches long by 1 inch high. The end boards 34, 38 and the center board 36 not only support the screen assembly 30, but also provide rapid water/rain drainage and free circulation of air up under the removable screen assembly 30 to reduce seed rot and spoilage. All the wood implementing the platform feeder station 29 is pressure treated for weather resistance. However, the dimensions of the platform feeder station 29 may be varied depending on design preference and stability constraints when mounted on top of pole 12.

Figure 3:
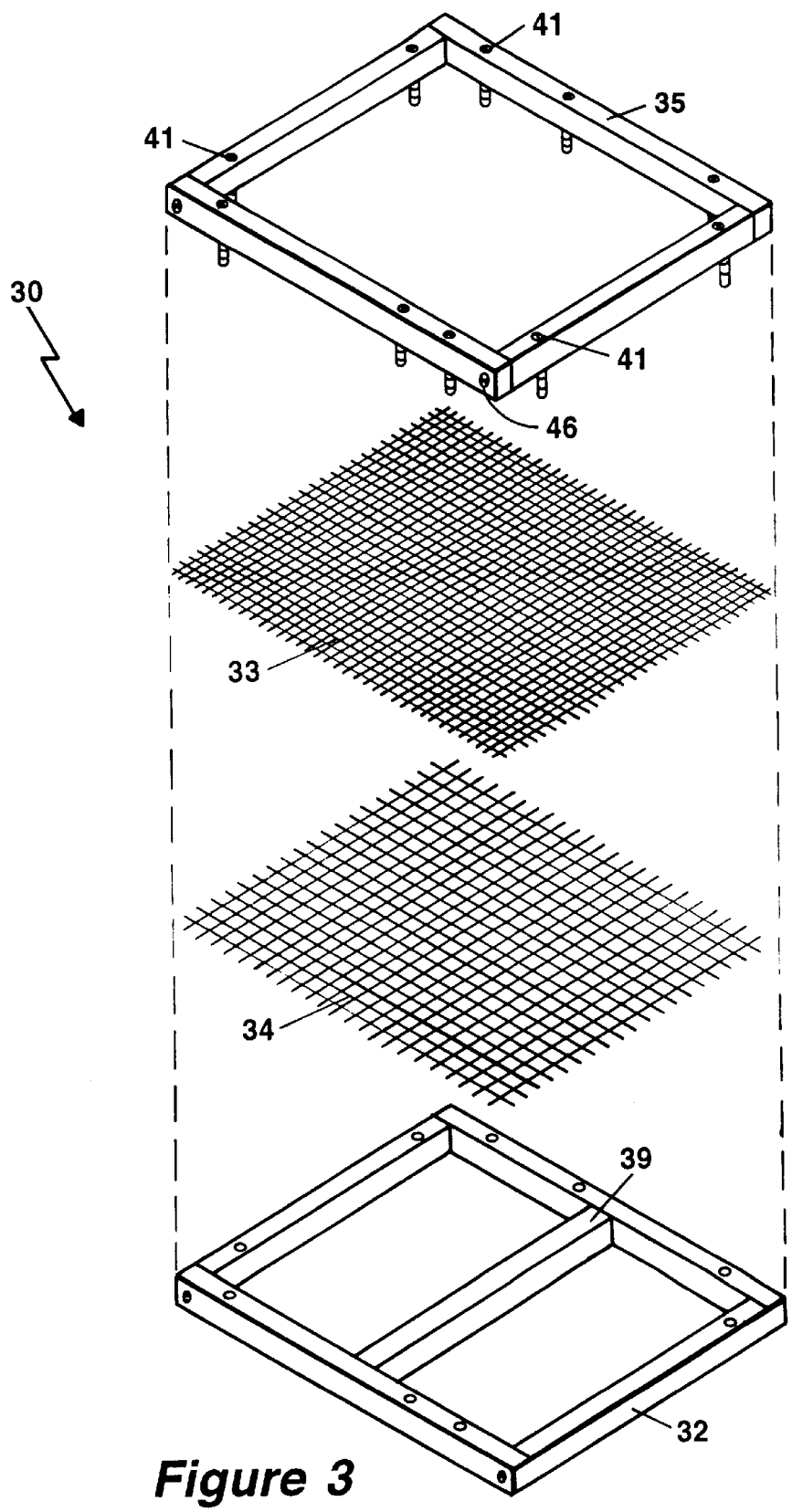
FIG. 3 is an exploded perspective view of the feeder screen assembly inserted in the platform feeder station of FIG. 2.

Referring to FIG. 3, an exploded perspective view of the feeder screen assembly 30 shows a top section 35 and a bottom section 32. A fine screen 33 having 1/16 inch spacing is disposed on top of a course screen 34 having ¼ inch spacing, and a cross support 39, which provides support to the mid point of both screens, is positioned in the center of bottom section 32 under the screens 33, 34. The sides of the screens 33, 34 are sandwiched between the top section 35 and the bottom section 32 when the top section 35 is secured to the bottom section by galvanized screws 41 around the peripheries of the feeder screen assembly 30.

Referring to FIG. 4 and FIG. 5, FIG. 4 shows a perspective view of a protective pitched roof 52 for the platform feeder station 29 having four corner posts for support above the platform feeder station 29, with three of the corner posts 70, 71, 72 shown in FIG. 4. FIG. 5 is a perspective view of an alternate embodiment of a protective roof 50 having a double pitch for the top of the platform feeder station 29 with four corner posts for support above the platform feeder station 29, with three of the corner posts 75, 76, 77 shown in FIG. 5.

Referring to FIG. 6, a side elevation view of an extended handle feeding cup 58 is shown for adding bird seed to the platform feeder station 29 on top of the pole 12. The length of the handle may be 4 feet to 6 feet for convenient use.

Referring again to FIG. 1 and as described above, the multi-station bird feeder 10 should be installed to a depth of at least 2 feet into the ground to ensure that the feeder 10 is firmly in place and that it has no lean or wobble to it. However, since the feeder 10 with the squirrel guard 14 prevents squirrels and other predators from gaining access to the multi-feeder stations 29, 53–56 from the ground, the other factor becomes placement of the feeder 10. The feeder 10 must be placed 10 to 12 feet from the nearest tree, overhanging branches, shrub, building or structure. If proper placement is accomplished squirrels will be prevented from jumping onto the feeder and circumventing the squirrel guard 14.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed as new and desired to be secured by Letters Patent of the United States is:

1. A bird feeder comprising:
    a feeder station;
    means installed in the ground for supporting said feeder station on top of said supporting means;
    said feeder station comprises a screen assembly means disposed within said feeder station;
    means positioned a predetermined distance below said top feeder station for hanging a plurality of feeder stations on an upper portion of said supporting means; and
    means positioned around a portion of said supporting means at a predetermined distance above said ground for preventing squirrels and other predators from climbing-up said supporting means, said preventing means comprises a polished surface.

2. The bird feeder as recited in claim 1 wherein said screen assembly means comprises a removable assembly having a frame wherein a fine screen is positioned on top of a course screen both secured within said frame.

3. The bird feeder as recited in claim 1 wherein said supporting means comprises a plurality of extended arms perpendicular to said supporting means for hanging feeder stations.

4. A multi-station bird feeder comprising:
    a feed platform;
    said feed platform comprises a removable screen assembly;
    means installed in the ground for supporting said feed platform on top of said supporting means;
    means positioned around a portion of said supporting means at a predetermined distance above said ground for preventing squirrels and other predators from climbing-up said supporting means; and
    means, extending in a plurality of directions around said supporting means under said feed platform for hanging a plurality of feeder stations.

5. The multi-station bird feeder as recited in claim 4 wherein said screen assembly comprises a fine screen positioned on top of a course screen both secured by a frame, said course screen having bird seed placed thereon, and a cross-support means attached under said screens for preventing said fine screen and said course screen from sagging.

6. The multi-station bird feeder as recited in claim 4 wherein said preventing means around a portion of said supporting means comprises a material having a polished surface.

7. The multi-station bird feeder as recited in claim 6 wherein said material having a polished surface includes aluminum, copper, ceramic or plastic.

8. A multi-station bird feeder having a squirrel guard for preventing squirrels and other predators from reaching the feeder comprising:

a pole having a predetermined length, a first portion being inserted into the ground and a second portion extending above the ground;

a feeder station attached to the top of said pole comprising a removable screen assembly, said screen assembly comprises a fine screen disposed on top of a course screen; and a plurality of arms extending from said pole a predetermined distance below said feeder station for hanging a plurality of feeder stations;

said squirrel guard includes a material having a polished surface surrounding said pole starting a first predetermined distance above the ground and extending up the pole a second predetermined distance.

9. The multi-station bird feeder as recited in claim 8 wherein said material of said squirrel guard comprises one of a plurality of materials including aluminum, copper, ceramic or plastic.

10. The multi-station feeder as recited in claim 9 wherein said pole comprises 4 sides.

11. The multi-station feeder as recited in claim 8 wherein said fine screen disposed on top of said course screen includes an upper frame and a lower frame for securing said fine screen and said course screen, and a cross-support means attached under said course screen for preventing said course screen from sagging.

12. A method of providing a multi-station bird feeder with squirrel protection comprising the steps of:

installing a pole in the ground for supporting a feeder station on top of said pole;

providing a screen assembly means in said feeder station for holding bird seed;

mounting, around said pole at a predetermined distance above the ground, means having a polished surface for preventing squirrels and other predators from climbing-up said pole; and extending arms from sides of said pole above said preventing means for hanging a plurality of feeder stations.

13. The method as recited in claim 12 wherein said step of providing a screen assembly means comprises the steps of positioning a fine screen on top of a course screen, and securing said fine screen and said course screen within an upper frame and a lower frame.

14. The method as recited in claim 12 wherein said step of providing a screen assembly means comprises the step of removing said screen assembly from said feeder station.

15. The method as recited in claim 12 wherein said step of mounting said polished surface means around said pole comprises the step of using one of a plurality of materials including aluminum, copper, ceramic or plastic.

16. The method as recited in claim 12 wherein said method comprises the step of positioning a slanted roof supported by posts on said feed platform.

17. The method as recited in claim 12 wherein said method comprises the step of positioning a double pitched roof supported by posts on said feed platform.

* * * * *